US012545577B2

(12) United States Patent
Delmas et al.

(10) Patent No.: US 12,545,577 B2
(45) Date of Patent: Feb. 10, 2026

(54) REUSABLE DIHYDROGEN GENERATOR

(71) Applicant: COMMISSARIAT A L'ENERGIE ATOMIQUE ET AUX ENERGIES ALTERNATIVES, Paris (FR)

(72) Inventors: Jerome Delmas, Grenoble (FR); Olivier Blanchot, Grenoble (FR); Philippe Capron, Grenoble (FR); Vincent Faucheux, Grenoble (FR); Isabelle Rougeaux, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1041 days.

(21) Appl. No.: 17/632,782

(22) PCT Filed: Jul. 30, 2020

(86) PCT No.: PCT/EP2020/071587
§ 371 (c)(1),
(2) Date: Feb. 3, 2022

(87) PCT Pub. No.: WO2021/023636
PCT Pub. Date: Feb. 11, 2021

(65) Prior Publication Data
US 2022/0315420 A1    Oct. 6, 2022

(30) Foreign Application Priority Data
Aug. 7, 2019 (FR) .................................... 19 09036

(51) Int. Cl.
*C01B 3/06* (2006.01)
*B01J 7/02* (2006.01)
*C01B 3/22* (2006.01)

(52) U.S. Cl.
CPC ................ *C01B 3/065* (2013.01); *B01J 7/02* (2013.01); *C01B 3/22* (2013.01)

(58) Field of Classification Search
None
See application file for complete search history.

(56) References Cited

U.S. PATENT DOCUMENTS 11,498,833 B2 * 11/2022 Delmas ................ C01B 3/0015
2006/0185242 A1    8/2006 Cha et al.
(Continued)

FOREIGN PATENT DOCUMENTS

FR    3 072 303 A1    4/2019
FR    3 072 304 A1    4/2019
(Continued)

OTHER PUBLICATIONS

International Search Report issued Oct. 6, 2020 in PCT/EP2020/071587 filed Jul. 30, 2020, 3 pages.

*Primary Examiner* — John J Figueroa
(74) *Attorney, Agent, or Firm* — Oblon, McClelland, Maier & Neustadt, L.L.P.

(57) ABSTRACT

Dihydrogen generator (5) comprising a chamber (10) and a catalytic system (15), the catalytic system being rigidly fastened to the chamber in a removable manner and comprising a catalysis housing (25) containing a catalyst (205) for the reaction for generating dihydrogen from a reagent (405) chosen from a hydride, a liquid organic hydrogen carrier and mixtures thereof, the chamber defining a chamber internal space (45), the catalysis housing being positioned at least partly in the chamber internal space.

18 Claims, 5 Drawing Sheets

(56) References Cited

U.S. PATENT DOCUMENTS

| | | | |
|---|---|---|---|
| 2009/0017346 A1* | 1/2009 | Laurent | C01B 3/065 422/162 |
| 2010/0150824 A1* | 6/2010 | Withers-Kirby | F17C 11/005 422/164 |
| 2011/0212374 A1* | 9/2011 | Rosenzweig | H01M 8/04216 429/421 |
| 2016/0087294 A1 | 3/2016 | Rosenzweig et al. | |
| 2017/0232413 A1 | 8/2017 | Sankir et al. | |
| 2020/0290002 A1 | 9/2020 | Bouvier et al. | |
| 2022/0274830 A1* | 9/2022 | Delmas | C01B 3/065 |

FOREIGN PATENT DOCUMENTS

| | | |
|---|---|---|
| WO | WO 2004/085307 A1 | 10/2004 |
| WO | WO 2010/051557 A1 | 5/2010 |
| WO | WO 2012/003112 A1 | 1/2012 |
| WO | WO 2012/058155 A1 | 5/2012 |
| WO | WO 2016/084025 A2 | 6/2016 |

* cited by examiner

REUSABLE DIHYDROGEN GENERATOR

TECHNICAL FIELD

The present invention relates to a generator for producing dihydrogen, by bringing a reagent-containing liquid into contact with a catalyst.

PRIOR ART

One known method for generating dihydrogen is to bring an aqueous hydride solution, for example a sodium borohydride solution, into contact with a catalyst of the hydride hydrolysis reaction, for example cobalt, platinum or ruthenium. A catalyzed hydrolysis reaction of the aqueous solution then occurs, generating dihydrogen.

By way of illustration, WO 2012/003112 A1 and WO 2010/051557 A1 describe dihydrogen generators comprising an enclosure containing the aqueous hydride solution and the catalyst for implementing such a catalyzed hydrolysis. One disadvantage with these generators lies in the fact that once no more gas can be generated as a result of the hydrides in the liquid solution being exhausted, it is impossible for the generator to be reused by replacing the aqueous solution, which then contains predominantly non-gaseous products of the dihydrogen generation reaction, with a fresh aqueous hydride solution. Another disadvantage is that it is impossible to recover the constituents of the generator that have high added value, for example the catalyst. The generator is then destined to be scrapped and recycling it is costly and takes time.

The aforementioned disadvantages limit the industrial and commercial development of such dihydrogen generators, which are more particularly intended for dispensing dihydrogen to a fuel cell to electrically power a portable device such as a portable computer, a mobile phone or a drone.

There is therefore a need for a dihydrogen generator that overcomes these disadvantages.

SUMMARY OF THE INVENTION

This need is met by means of a dihydrogen generator comprising an enclosure and a catalytic system, the catalytic system being secured rigidly and removably to the enclosure and comprising a catalysis housing containing a catalyst for the reaction of generating the dihydrogen from a reagent chosen from a hydride, a liquid organic hydrogen carrier and mixtures thereof, the enclosure defining an enclosure interior space, the catalysis housing being placed at least in part in the enclosure interior space.

When the generation of gas is complete, for example as a result of the absence of available reagent, the catalytic system may be removed from the enclosure with a view to subsequent reuse. After cleaning the spent enclosure, the catalytic system can be reused by securing it once again on the spent enclosure or on another enclosure, for example within which no dihydrogen-generating reaction has been carried out.

What is meant by "removably" is that the catalytic system can be removed from and refitted to the enclosure more than once, or more than twice, or better still more than ten times without impairing the operation of the generator. In particular, the catalytic system can be removed from the enclosure more than once without the catalytic system and the enclosure being damaged. For example, the catalytic system may be removed from and then refitted to the enclosure more than twice, or more than ten times, even more than one hundred times, without damaging the enclosure and the catalytic system. The removal from the enclosure of the catalytic system may be performed by grasping the catalytic system directly, or by means of a tool, for example a screwdriver.

The catalytic system may be secured to the enclosure using magnets or screw-fastening or snap-fastening or may be secured to the enclosure by means of a device of the bayonet locking type.

The securing of the catalytic system on the enclosure and the removal of the catalytic system from the enclosure are thus simple to perform. As a preference, the securing and the removal are performed by means of a suitable tool. The tool is, for example, specific to an organization suitably certified for securing or removing the catalytic system and for cleaning the enclosure of the non-gaseous reaction products which may prove to be corrosive.

The enclosure and the catalytic system may comprise an element for securing the enclosure on the catalytic system and an element for securing the catalytic system on the enclosure, respectively.

The enclosure may comprise an opening providing access to the enclosure interior space, and the catalytic system may be configured to be introduced into and extracted from the enclosure interior space via the opening providing access to the enclosure interior space when the catalytic system is being fitted to and removed from the enclosure, respectively.

The enclosure may comprise an enclosure wall and a window may be formed in the enclosure wall. The window may pass right through the enclosure wall through the thickness thereof and open via the opening providing access to the enclosure interior space. The window has a perimeter defined by the enclosure wall. The perimeter of the window may comprise the element for securing the enclosure on the catalytic system.

The enclosure may comprise a neck opening onto the opening providing access to the enclosure interior space. The neck may have a tubular and hollow shape. It may comprise the element for securing the enclosure on the catalytic system.

The element for securing the enclosure on the catalytic system and the element for securing the catalytic system on the enclosure may have complementary shapes. The element for securing the enclosure on the catalytic system and the element for securing the catalytic system on the enclosure may each be a screw thread.

The element for securing the enclosure on the catalytic system may comprise a slot made in the enclosure and the element for securing the catalytic system on the enclosure may be a relief configured to engage in the slot when the catalytic system is being fitted onto the enclosure, and vice versa.

The catalytic system may comprise a plug mounted removably on the enclosure.

The plug may plug the opening providing access to the enclosure interior space.

In a variant, the enclosure may define another opening providing access to the enclosure interior space, the plug plugging the other opening providing access to the enclosure interior space.

The opening providing access and the other opening providing access may be positioned opposite one another.

The plug may notably fit onto the top of the neck as described hereinabove. In a variant, it may be placed in the window formed in the enclosure wall. In particular, it may comprise the element for securing the catalytic system on the enclosure. For example, the plug has a face, in contact with the perimeter of the window, which comprises the element for securing the catalytic system.

The catalytic system may comprise a fitting member for fitting the catalysis housing onto or extracting same from the enclosure interior space when respectively fitting the catalytic system onto the enclosure and/or removing same therefrom.

The fitting member may be positioned outside of the enclosure interior space. In particular, it may comprise a portion that can be grasped. In particular, the fitting member may be secured to the plug. In this way, the user can take hold of the fitting member in their hand, avoiding contact with a substance, for example a corrosive substance, contained in the enclosure interior space.

The catalytic system comprises a catalysis housing containing a catalyst that catalyzes the dihydrogen generation reaction by coming into contact with the reagent.

As a preference, the catalyst comprises, or even consists of, at least one metal selected from cobalt, platinum, ruthenium, nickel and alloys thereof. In particular, when the reagent is based on borohydride, the catalyst is preferably at least one metal selected from cobalt, ruthenium and alloys thereof.

The catalysis housing preferably comprises first and second components which together define a catalysis chamber, the catalyst being housed in the catalysis chamber, the first and second components being able to move one relative to the other between a closed position in which the catalysis chamber is isolated from the enclosure interior space and an open position in which the catalysis chamber is in fluidic communication with the enclosure interior space. Such a housing allows optimal control of the generation of hydrogen.

The catalytic system may comprise a catalysis actuator, for example an actuating cylinder or a motor, for moving the first and second components one relative to the other.

The catalysis housing may be positioned at a distance from the plug. In particular, a connecting member may be positioned between the plug and the catalysis housing and be fixed by its opposite ends to the plug and to the catalysis housing.

The connecting member may be flexible or rigid. It may have a tubular and hollow shape. For example, the catalysis actuator may be housed in the connecting member.

The connecting member may contain an electric cable for electrically powering the catalysis housing.

Furthermore, the gas generator may comprise an enclosure sealing gasket placed, and preferably compressed, between the catalytic system and the enclosure. This thus prevents reagent and/or dihydrogen from escaping during the generation.

The enclosure sealing gasket may be of annular shape.

The enclosure sealing gasket may be borne by the plug or by the enclosure.

Furthermore, the catalytic system may comprise an information module configured to acquire and store information relating to the state of the catalytic system. The information module thus allows the user of the generator to know the history of the catalytic system independently of the history of the other constituents of the generator.

Information relating to the state of the catalytic system may be the nature, and notably the composition, of the catalyst, which may be adjusted to the targeted application, the date of manufacture of the catalyst, the date on which the catalytic system was fitted to the enclosure, the number of times the catalysis housing has been opened and closed, the number of times the generator has been connected to a fuel cell or to any other device requiring a supply of dihydrogen.

In particular, the plug may comprise a compartment, isolated from the enclosure interior space, containing the information module. The compartment may be hermetically sealed to protect the constituents of the information module.

The information module may comprise a communications unit for transmitting to a receiver unit information pertaining to the state of the catalytic system. For example, the transmission unit comprises an RFID chip for remote radio identification, which can be read by a suitable reader held by the user of the generator.

The opening and closing of the catalysis housing may be active, that is to say requiring implementation of an external control. In particular, the generator may comprise a control unit configured to activate the opening or closing of the catalysis housing, particularly on the basis of the value of a parameter that is to be monitored, for example the pressure in the enclosure or the temperature of the enclosure.

The control unit may comprise means for receiving control signals for the catalytic system coming from a fuel cell to which the generator may be connected.

The generator may comprise a unit for measuring the parameter that is to be monitored.

As a preference, the catalytic system comprises the measurement unit and/or the control unit. Such units, of design which is complex and expensive, may thus advantageously be reused.

In a variant, the opening and closing of the catalysis housing may be passive. An example of passive opening and closing of the catalysis housing is described in application WO 2010/051557 A1.

The generator may comprise a reservoir for containing a liquid. The reservoir comprises a reservoir wall that is fluidtight with respect to liquid and permeable to dihydrogen. The reservoir is preferably housed inside the enclosure interior space. The catalytic system may be placed at least in part in the reservoir.

The reservoir wall is for example a flexible membrane.

The enclosure may comprise a discharge valve for extracting the dihydrogen from the enclosure interior space, an injection valve for injecting the liquid into the reservoir and a drain valve for draining the liquid from the reservoir.

The discharge valve may comprise a filter to purify the stream of di hydrogen leaving the enclosure.

The injection valve may comprise a nonreturn check valve for preventing the reservoir from being drained through the injection valve and for preventing the dihydrogen from being discharged from the enclosure interior space. The nonreturn check valve of the injection valve is, for example, a ball-type check valve, a disk-type check valve, a swing-type check valve or a guided-plug check valve.

The injection valve may be self-sealing. A self-sealing valve is configured to collaborate with a member, notably an end piece, for example mounted on the end of a pipe, so that when the member, when introduced into the self-sealing valve, places the self-sealing valve in a configuration of fluidic communication between the enclosure interior space and the member, and, when the member is extracted from the self-sealing valve, the self-sealing valve defines a fluidtight boundary to prevent any fluidic transfer through it.

In particular, the injection valve may be a self-sealing valve and comprise a nonreturn check valve.

The reservoir may be fixed on the discharge valve.

The drain valve is preferably configured to place the reservoir in fluidic communication with the environment of the generator when the pressure in the reservoir is higher than or equal to a drain pressure and to hermetically isolate the reservoir from the environment of the generator when the pressure in the reservoir is lower than the drain pressure.

The drain valve may comprise a nonreturn check valve, for example of the type as described hereinabove, and/or may be self-sealing. The drain pressure may be higher than 1 bar, or even higher than 2 bar, or even higher than 5 bar.

The injection valve and the drain valve may be self-sealing. The generator may notably be connected to a cleaning device comprising a feed pipe equipped with an injection end piece for collaborating with the injection valve and a drain pipe equipped with a draining end piece for collaborating with the drain valve. The cleaning device may further comprise a feed pump for injecting a cleaning liquid into the reservoir. The pressure in the reservoir may be equal to the drain pressure, for example equal to atmospheric pressure. Advantageously, the cleaning may therefore be performed at low pressure. Furthermore, the cleaning device may comprise a reserve containing the cleaning agent to supply the feed pump and a storage tank to receive the cleaning liquid drained out through the drain valve. The assembly formed by the generator and the cleaning device may be hermetic. This thus reduces the probability of an escape of the cleaning agent occurring and of the cleaning agent coming into contact with a user of the generator.

The discharge valve is preferably configured to place the enclosure interior space in fluidic communication with the environment of the generator when the pressure in the enclosure interior space is higher than or equal to a discharge pressure and to hermetically isolate the enclosure interior space from the environment of the generator when the pressure in the enclosure interior space is lower than the discharge pressure.

The drain pressure is preferably higher than the discharge pressure. It is thus ensured that the drain valve is closed during the generation of the dihydrogen and that the dihydrogen is not extracted via the drain valve.

The discharge valve may comprise a nonreturn check valve and/or be self-sealing. In particular, it may be configured to collaborate with an end piece borne by a device, for example a fuel cell, intended to receive the dihydrogen produced by the generator. The form of the discharge valve may be specifically chosen to ensure that the generated dihydrogen can be dispensed only to a device suitable for receiving it.

The enclosure may comprise a filling pipe for introducing a liquid, for example a solution containing a solvent for the reagent, for example water, or a solution containing the reagent, into the enclosure interior space, and preferably into the reservoir.

The enclosure may contain the reagent. More specifically, the reservoir may contain the reagent. In particular, in one embodiment, the reservoir may comprise a solution, notably an aqueous solution, containing the reagent.

The reagent may be selected from a hydride, a liquid organic hydrogen carrier and mixtures thereof. The hydride may be selected from potassium borohydride, sodium borohydride, magnesium borohydride, calcium borohydride, lithium borohydride, lithium aluminum hydride, magnesium hydride, sodium aluminum hydride and mixtures thereof. It may further comprise an additive selected from alkaline agents, for example potassium hydroxide and sodium hydroxide, or crystallization inhibitors, for example sodium tartrate and methyl 4-hydroxybenzoate.

A "liquid organic hydrogen carrier" is also known by its abbreviation LOHC. The liquid organic hydrogen carrier may be selected from cyclohexane, decalin, N-ethylcarbazole, dibenzyltoluene, 1,2-dihydro-1,2-azaborine, formic acid, methanol, naphthalene, toluene, benzyltoluene, 3-methyl-1,2-BN-cyclopentane, 2-aminoethanol, benzene, indoline, quinoline, fluorene, 4-aminopyridine, bicyclohexyl, 1,2,4-triazolidine, lithiated primary amine, 2-methyl-1,2,3,4-tetrahydroquinoline, perhydrodibenzofuran, 2,6-dimethyldecahydro-1,5-naphthyridine, N-ethylindole, N-propyl carbazole and mixtures thereof.

The enclosure may comprise a vessel and a lid fixed rigidly and removably to the vessel and plugging the vessel.

The vessel may comprise the injection valve and the lid may comprise the drain valve, or vice versa.

The lid may be screw-fastened or snap-fastened onto the vessel or be secured thereto using magnets or be secured to the vessel by means of a bayonet locking system.

As a preference, the window providing access to the enclosure interior space is formed in a wall of the vessel.

The lid may comprise a receptacle and a covering membrane hermetically plugging the receptacle, the receptacle containing the reagent, preferably in a solid form. The lid may thus form a reagent refill for the dihydrogen generation. In particular, when the dihydrogen generation is finished, through absence of accessible or consumed reagent, a new lid may be fitted to the vessel in place of the spent lid. Advantageously, it is thus possible to select a lid with a reagent composition suited to the conditions of use of a fuel cell that is to be supplied with dihydrogen by means of the generator. For example, in order to generate dihydrogen at ambient temperature, the lid that is to be fitted to the vessel may contain a high concentration of $NaBH_4$. In order to generate dihydrogen at lower ambient temperature, the lid that is to be fitted to the vessel may contain a mixture of $NaBH_4$ and of $KBH_4$. Furthermore, because the quantity of reagent has a direct influence on the volume of dihydrogen generated, it is possible to fit to the vessel lids which have different receptacle volumes and different volumes of reagents.

The covering membrane may be fixed, notably adhesively bonded, to the receptacle.

The covering membrane can hermetically isolate the reagent from the catalysis housing. Thus, after the lid has been fitted to the vessel, as long as the covering membrane has not been pierced, any dihydrogen-generating reaction is prevented.

The covering membrane may be a film, for example a metal or thermoplastic film, preferably stretched between opposing edges of the receptacle.

As a preference, the generator comprises a piercing member configured to pierce the covering membrane. The piercing member may comprise a blade or a spike, or may have a chamfered shape.

The generator may comprise a piercing actuator configured to move the piercing member in such a way as to pierce the covering membrane. The piercing actuator may be actuated by the user.

The lid may comprise the piercing actuator and/or the piercing member.

Furthermore, the invention relates to a method for cleaning a dihydrogen generator according to the invention comprising a reservoir containing a liquid product and optionally a solid product immersed and for example in solution in the liquid product, an injection valve and a discharge valve as described, the method comprising the injection into the reservoir, through the injection valve, of a cleaning agent at a drain pressure, so as to discharge the liquid product, and where appropriate the solid product, from the reservoir through the discharge valve.

The cleaning agent is preferably liquid. It contains water, preferably representing over 80%, or even over 90%, of its mass. It may be water.

The liquid product may be different than the cleaning agent.

As a preference, the liquid product contains a non-gaseous product of the dihydrogen-generating reaction. It may further contain potassium hydroxide and/or sodium hydroxide.

The non-gaseous product is different from the dihydrogen. It may be selected from sodium metaborate, potassium metaborate and mixtures thereof.

The solid product may be a product of the dihydrogen-generating reaction, for example sodium metaborate that has precipitated in the liquid product.

The temperature of the cleaning agent is preferably higher than 30° C., notably higher than 50° C., to make it easier for the non-gaseous product, for example $NaBO_2$ and/or $KBO_2$, to dissolve.

The temperature of the generator may be higher than 30° C. or even higher than 50° C.

The method may involve injecting a first cleaning agent and injecting a second cleaning agent. For example, the purpose of the first agent is to dissolve the non-gaseous products and the purpose of the second product is to rinse out the reservoir.

In order to dry the reservoir, the method may involve, subsequent to the injection, the drying of the reservoir by blowing a gas, notably air, into the reservoir through the injection valve.

BRIEF DESCRIPTION OF THE FIGURES

The invention may be better understood from reading the following detailed description with the support of the attached drawings, in which.

Figure 1:
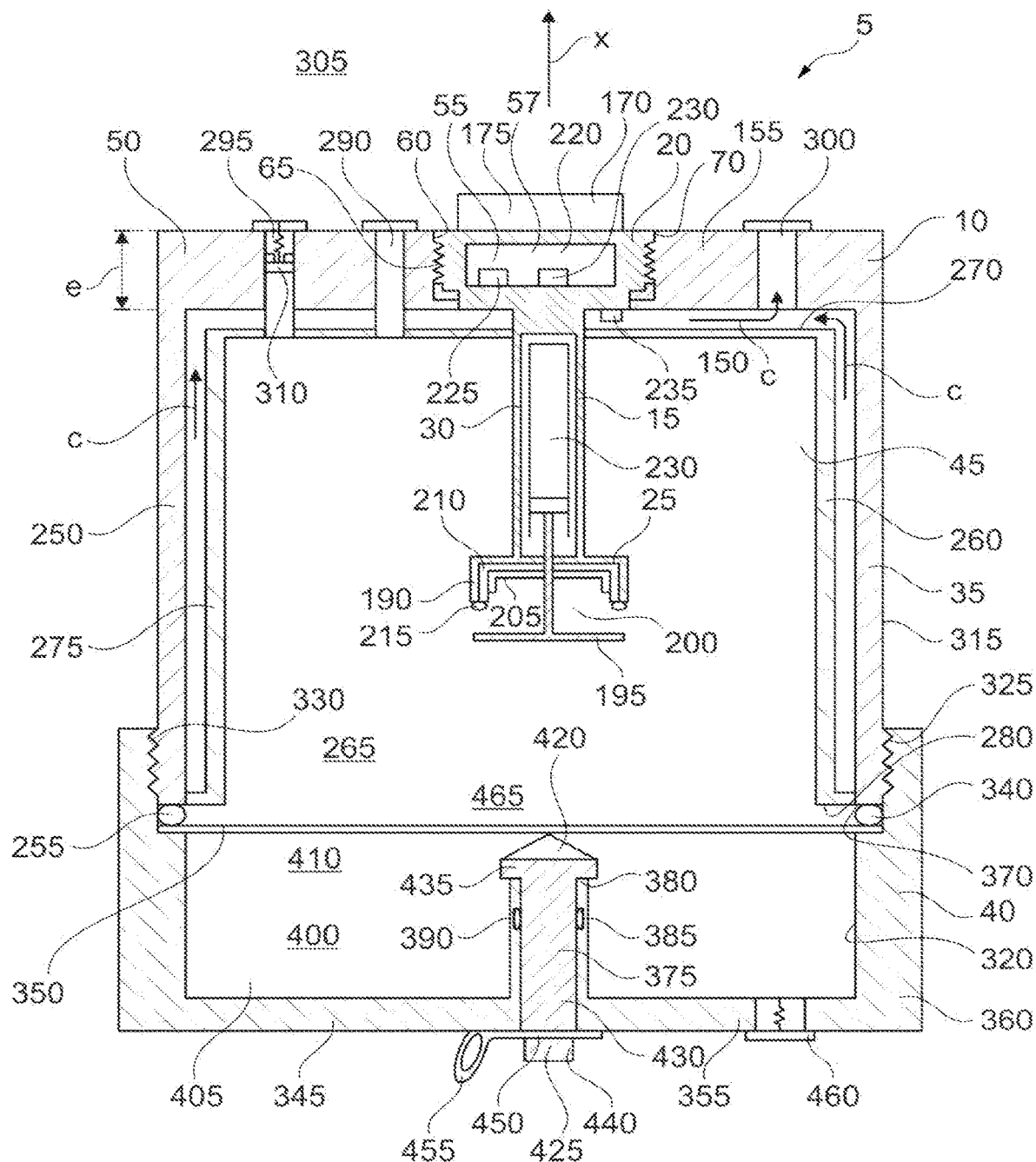
FIG. 1 depicts a cross section in a longitudinal plane of a first example of a generator according to the invention.

For the sake of clarity of the drawing, the various members that make up the generator have not been drawn to scale and in proportion in the figures.

DETAILED DESCRIPTION

FIG. 1 depicts an example of a dihydrogen generator 5 according to the invention. The generator comprises an enclosure 10 and a catalytic system 15 secured removably to the enclosure.

The catalytic system comprises a plug 20 and a catalysis housing 25 joined together by a connecting member 30.

The enclosure extends in a longitudinal direction X. It comprises a vessel 35 and a lid 40 fitted on the vessel. The vessel and the lid together delimit an enclosure interior space 45.

The vessel comprises a vessel end wall 50 defining an upper wall of the enclosure.

The catalytic system is secured to the upper wall of the enclosure.

The upper wall comprises a window 55 passing right through the upper wall in its thickness e. The window defines an opening 57 providing access to the enclosure interior space.

The plug 20 is engaged in the window 55. It comprises a portion, the shape of which complements the perimeter 60 of the window providing access to the enclosure interior space. The plug thus plugs the opening providing access to the enclosure interior space.

The perimeter of the window comprises an element 65 for securing the enclosure onto the catalytic system which, in the example illustrated, is a thread screw. The plug comprises, on its side face, an element 70 for securing the catalysis system onto the enclosure which is a screw thread of a shape that complements the element for securing the enclosure onto the catalytic system. The catalytic system may thus be screwed onto the enclosure.

Figure 2:
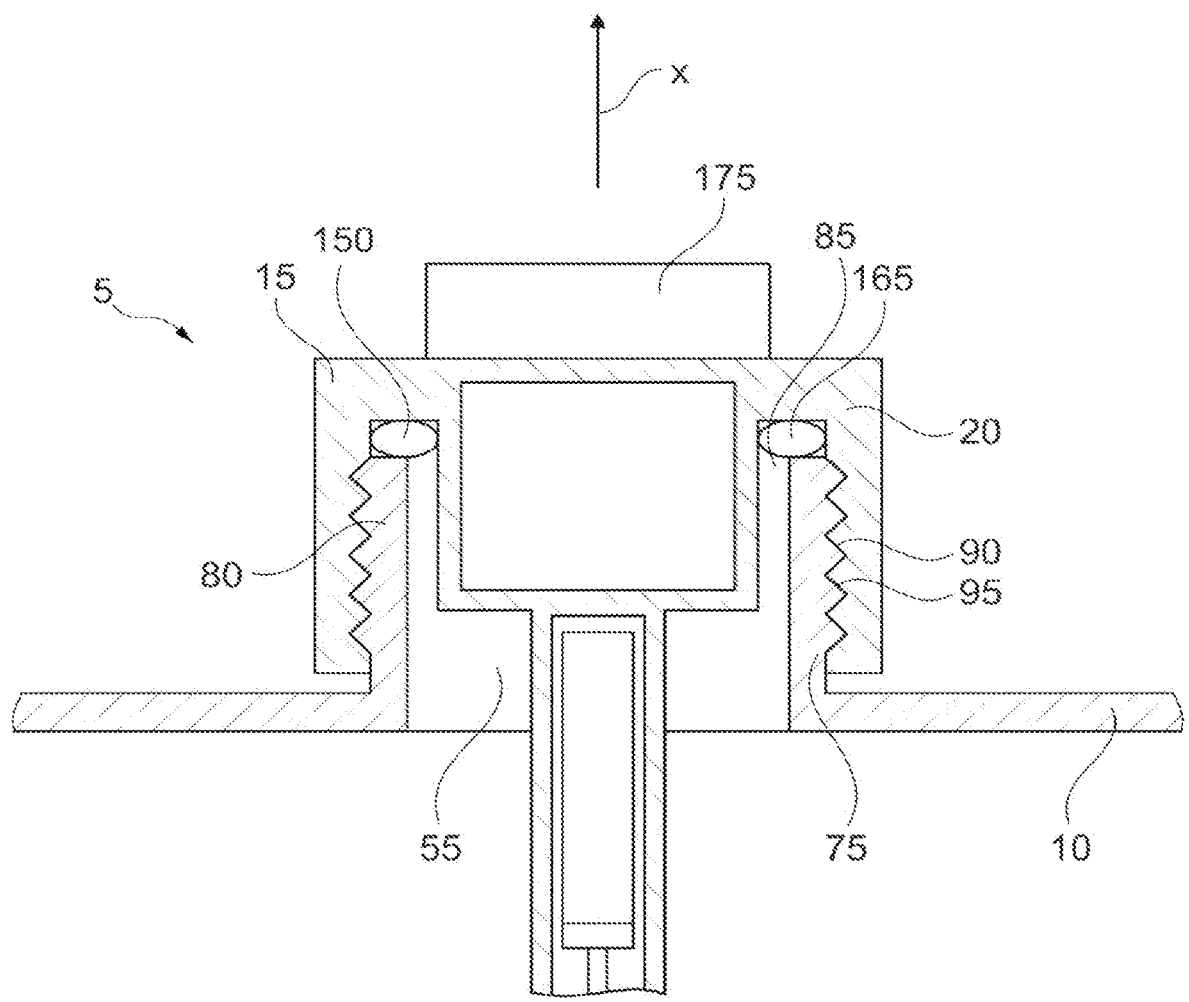
FIG. 2 depicts a cross section in a longitudinal plane of a part of a second example of a generator according to the invention.

According to another example illustrated in FIG. 2, the enclosure comprises a neck 75 having a tubular and hollow overall shape that defines the window 55. The neck comprises a neck wall 80 which extends in the direction of extension from the upper wall and which opens via an opening 57 providing access to the enclosure interior space surmounting the window. The neck wall comprises an exterior face 90 which bears a screw thread 95. The plug 20 of the catalytic system comprises a shape that complements the neck and is screwed onto the neck in order to plug the opening providing access to the enclosure interior space.

Figure 3:
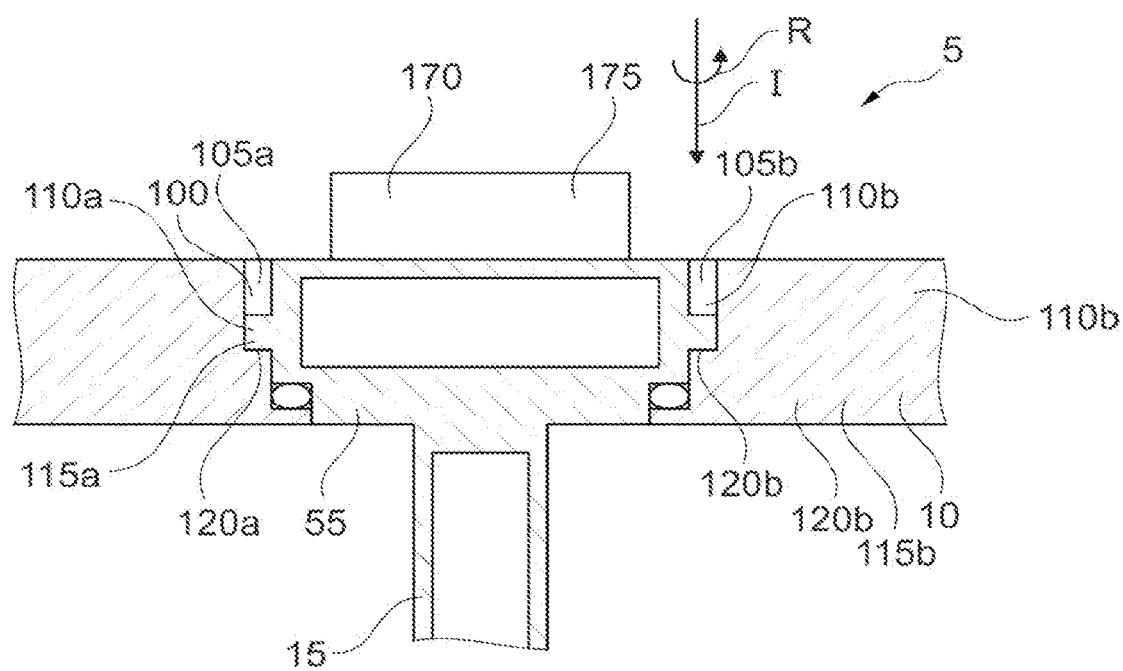
FIG. 3 depicts a cross section in a longitudinal plane of a part of a third example of a generator according to the invention.

In a variant illustrated in FIG. 3, the catalytic system 15 is secured to the enclosure 10 by means of a device of the bayonet locking type 100. The enclosure comprises slots 105a-b formed in the perimeter of the window arranged on either side of the plug 20. Each slot has an insertion portion 110a-b extending in the direction of insertion I of the catalytic system and which is extended by a locking portion which extends in a plane transverse to the direction of insertion. The plug comprises lugs 115a-b which each project from the side wall of the plug and are configured to each slide in one of the corresponding slots. In order to secure the catalytic system to the enclosure, the user inserts the catalysis housing into the enclosure interior space through the window 55 and then engages each lug in the insertion portion until the lug butts against the corresponding end 120a-b of the insertion portion. Next, through a rotational movement R about the axis of insertion, the user inserts each lug into the corresponding locking portion so that the lug butts against the side walls of the locking portion and blocks the movement of the catalytic system with respect to the enclosure in the direction of insertion.

Figure 4:
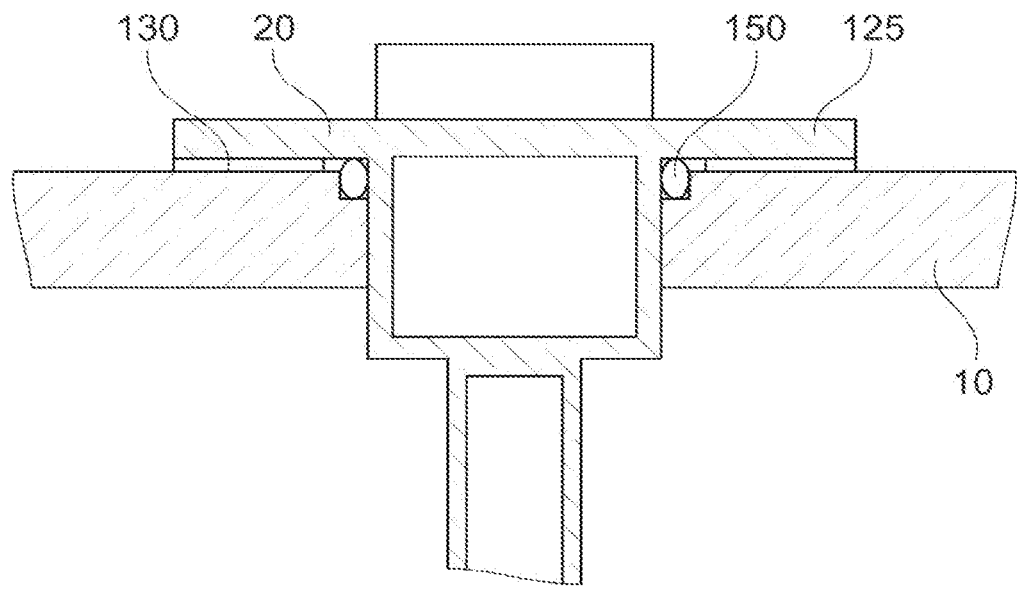
FIG. 4 depicts a cross section in a longitudinal plane of a part of a fourth example of a generator according to the invention.

In another variant, the catalytic system may be fixed to the enclosure using magnets. For example, as illustrated in FIG. 4, the plug may comprise a flange 125, positioned outside of the enclosure, which is superposed on the enclosure 10. The enclosure is covered with a coating 130 made of a magnetized material, for example a neodymium-based alloy. The flange is made of a ferromagnetic material, for example a steel, and is placed facing the magnetized coating. The attraction of the magnetized flange to the ferromagnetic coating holds the catalytic system rigidly fixed to the enclosure. A person skilled in the art easily knows how to select the surface area for the magnetized coating and the dimensions of the flange in order to ensure the reliability of the connection between the catalytic system and the enclosure, notably when the enclosure interior space is subjected to the pressure of the dihydrogen.

Figure 5:
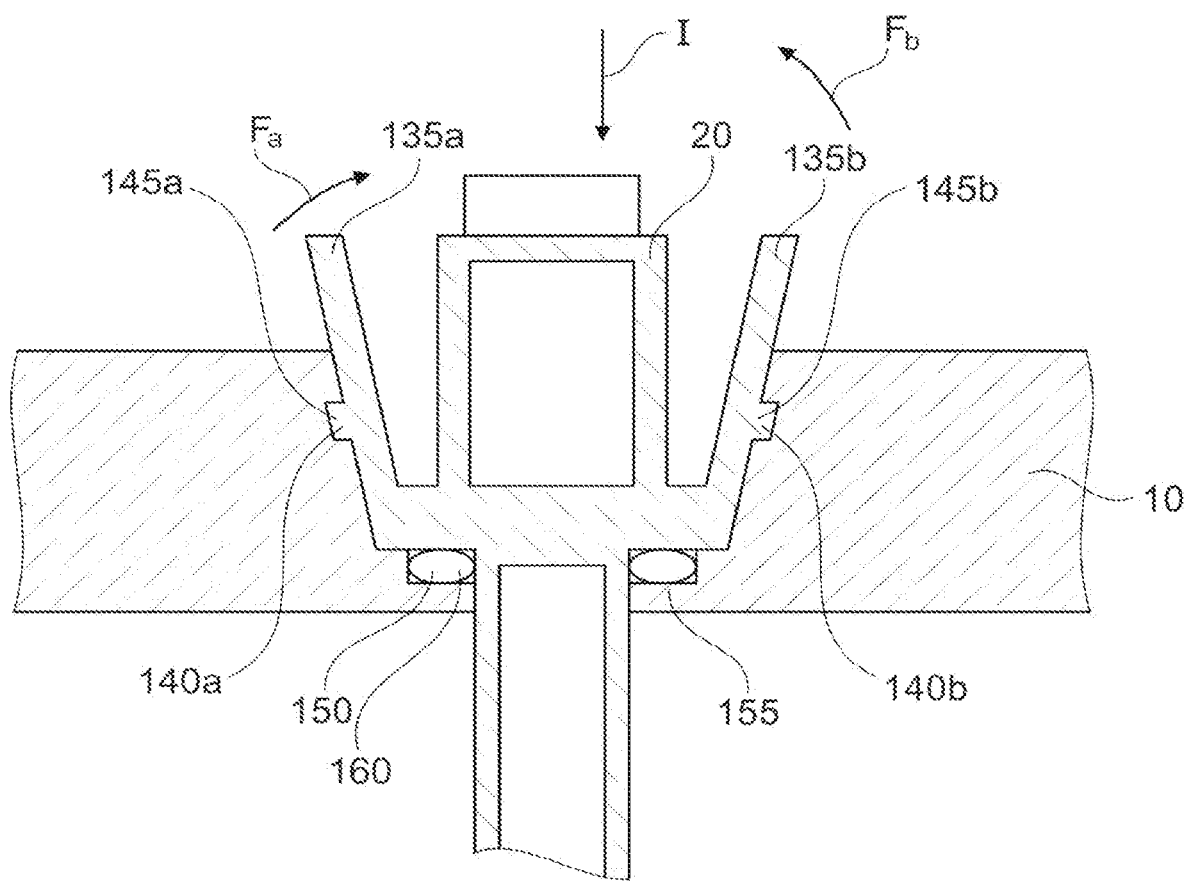
FIG. 5 depicts a cross section in a longitudinal plane of a part of a fifth example of a generator according to the invention.

In another variant, the catalytic system may be fixed to the enclosure removably using snap fastening. For example, as illustrated in FIG. 5, the plug comprises flexible tabs 135a-b arranged on either side of the plug with respect to a median plane containing the longitudinal direction. Each tab extends obliquely with respect to the direction in which the catalytic system is inserted into the enclosure interior space. The flexible tab has a rib 140a-b configured to engage in a recess 145a-b of complementary shape formed in the perimeter of the window. As the catalytic system is inserted into the enclosure interior space, the elastic tab deforms and the rib can slide against the perimeter of the window until being engaged in the recess. It then butts against the recess so as to prevent any movement of the catalytic system with respect to the enclosure. In order to remove the catalytic system, the user may apply a bending force to each elastic tab, illustrated by the arrows Fa-b, so as to extract each rib from the corresponding recess and may then extract the catalytic system from the enclosure by translational movement in the direction of insertion I.

Furthermore, in order to ensure sealing of the connection between the catalytic system and the enclosure, the generator of FIGS. 1 to 5, comprises an enclosure sealing gasket 150. In the example of FIGS. 1 and 3 to 5 the enclosure comprises a shoulder 155, projecting from the perimeter of the window and which defines a seating surface 160 against which the enclosure sealing gasket rests. Thus, after the catalytic system has been fitted onto the enclosure, the enclosure sealing gasket is compressed between the enclosure 10 and the plug 20, limiting, or even preventing, the escape of the dihydrogen that is in the process of being generated. In a variant, as illustrated in FIG. 2, the plug may comprise the enclosure sealing gasket, which is forced against the end wall 165 of the plug.

The catalytic system may furthermore comprise a fitting member 170 positioned outside of the enclosure. In FIGS. 1 to 5, the fitting member is a tongue 175 projecting in the longitudinal direction of the plug. The user may thus take hold of the tongue in their hand in order to fit/remove the catalytic system. Other fitting members may be envisioned in place of the tongue.

The catalysis housing 25 is housed in the enclosure interior space 45.

It comprises a first 190 and a second 195 component which are able to move the one relative to the other. The first and second components may be capable of translational and/or of rotational movement, for example in and/or about the longitudinal direction X, respectively.

The first and second components define a catalysis chamber 200. A catalyst 205, for example at least one metal selected from cobalt, nickel, platinum, ruthenium and alloys thereof, is placed on a porous support 210 in the catalysis chamber. Furthermore, the catalysis housing comprises a housing sealing gasket 215 which is placed between the first and second components. When the catalytic system is in a closed configuration, the first and second components are arranged the one relative to the other in such a way that the catalysis chamber is hermetically closed, the first and second components notably compressing the housing sealing gasket. When the enclosure contains a liquid, no ingress of the liquid into the catalysis chamber is possible.

In an open configuration depicted in FIG. 1, the first and second components are arranged in such a way that the catalysis chamber 200 is in fluidic communication with the enclosure interior space 45. When the liquid contains the reagent, as will be described hereinafter, the reagent can come into contact with the catalyst so that the hydrogen generation reaction is carried out.

Furthermore, the catalysis system comprises a compartment 220 formed in the plug and hermetically isolated from the enclosure interior space, in which an information module 225 is located. The information module is configured to acquire and store information relating to the state of the catalytic system. The information module may comprise an information storage unit, for example a memory of "Flash drive" type or an RFID chip.

The information may be the nature, notably the composition, of the catalyst which may be adjusted to the targeted application, the date of manufacture of the catalyst, the date on which the catalytic system was fitted to the enclosure, the number of times the catalysis housing has been opened and closed, the number of times the generator has been connected to a fuel cell.

The catalytic system comprises, for example, a contact sensor, not depicted, for detecting the coming into contact of the catalytic system with the enclosure and which is configured to transmit the corresponding information to the information module. The information module may comprise a clock and a battery to power the clock and the contact sensor. In this way, it is able to combine the contacting information with the time at which the information is received in order to define the date on which the catalytic system was fitted to the enclosure. For example, it iterates the counter of the number of times that the catalytic system has been mounted on an enclosure.

The catalytic system further comprises a control unit 230 configured to activate the opening or the closing of the catalysis housing, and a unit 235 for measuring a parameter that is to be monitored. In the variant in which the reagent is a hydride, the parameter that is to be monitored is preferably the pressure in the enclosure. In the variant in which the reagent is a liquid hydrogen carrier, the parameter that is to be monitored is preferably the temperature of the liquid hydrogen carrier.

The control unit is configured to receive a value of the parameter that is to be monitored originating from the measurement unit and, after analyzing said value, to proceed to the opening or closing of the catalysis chamber or to keeping the catalysis chamber in the open or closed position.

As a preference, the catalytic system comprises the control unit and/or the measurement unit. In particular, the control unit may be arranged in the compartment. This unit, of design which is complex and expensive, is thus protected.

The connecting member 30 is a rigid and hollow tube in which there is housed an actuating cylinder 230 connected to the second component and controlled by the control unit to actuate the opening or closing of the catalytic system. The tube may be flexible, notably in a variant in which the opening and closing of the catalytic system is performed passively, as is described in application WO 2010/051557 A1.

As far as the enclosure is concerned, the vessel 35 has a side wall 250 which extends from the vessel end wall 50 along the longitudinal direction as far as an edge 255 opposite to the vessel end wall.

The vessel comprises a reservoir 260, arranged inside the enclosure interior space, which is fixed to the vessel. The reservoir comprises a wall which delimits a reservoir interior space 265.

The reservoir and the vessel have shapes that are substantially homothetic with respect to one another. The reservoir thus comprises a reservoir end wall 270 and a reservoir side wall 275 which are positioned at a distance respectively from the vessel end wall and from the vessel side wall. The vessel side wall is extended at its opposite edge as far as the end wall of the reservoir by an annular flange 280 fixed to the vessel side wall.

The reservoir is formed of a material that is impervious to a liquid and porous to dihydrogen. For example, it is made of a porous hydrophobic membrane based for example on polyethylene or on polytetrafluoroethylene.

Furthermore, the enclosure comprises a filling pipe 290, an injection valve 295 and a discharge valve 300.

The filling pipe is of tubular and hollow shape. It passes through holes of complementary shape formed in the vessel and in the reservoir. The filling pipe opens at one of its ends into the reservoir interior space and via its other end to the outside of the vessel. It is surmounted by a valve, not depicted. When the valve is in the open position, the filling pipe places the environment 305 of the generator in fluidic communication with the enclosure interior space.

The injection valve 295 allows a liquid to be injected under pressure into the interior space of the reservoir. It passes through orifices of complementary shape formed in the vessel and in the reservoir and places the environment of the generator and the enclosure interior space in fluidic communication.

The injection valve is of self-sealing type. It comprises a nonreturn check valve 310 to prevent the reservoir from being drained through the injection valve and to prevent the dihydrogen from being discharged from the enclosure interior space.

The discharge valve 300 purges the enclosure of the dihydrogen formed during the generation reaction. It is housed in an orifice formed in the vessel end wall and opens into the space formed between the vessel end wall and the reservoir end wall.

The enclosure, and notably the vessel, comprises an overpressure relief valve, not depicted, to prevent any excessive rise in the dihydrogen pressure in the enclosure. Beyond a predefined pressure value which is dependent on the application, for example equal to 2 bar, the overpressure relief valve opens so as to discharge the excess dihydrogen from the reservoir and to reduce the pressure in the enclosure. The overpressure relief valve may comprise a nonreturn check valve or a membrane as described in application WO2012/058155 A1. The lid 40 is screwed onto the vessel. The vessel and the lid have tubular and hollow portions of mutually complementary shapes. The external face 315 of the wall of the tubular portion of the vessel and the internal face 320 of the wall of the tubular portion of the lid comprise screw threads 325-330 of complementary shapes and which are fully in contact with one another.

According to variants which have not been depicted, the lid may be attached to the vessel by magnets or be attached to the vessel by means of a bayonet locking system.

Furthermore, the enclosure comprises a lid sealing gasket 340, sandwiched between the vessel and the lid, to prevent a liquid contained in the reservoir interior space from escaping from the enclosure.

The lid comprises a receptacle 345 and a covering membrane 350.

The receptacle has a receptacle end wall 355, which defines an enclosure lower wall, and a receptacle side wall 360 which extends from the end wall in the longitudinal direction and is fixed to the vessel. The side wall furthermore comprises an annular groove 370 to which the covering membrane is fixed and in which the lid sealing gasket is housed.

The receptacle end wall comprises a recess 375 in which a receptacle opening is formed. A tubular and hollow skirt 380 extends in the longitudinal direction from the receptacle opening. The tubular skirt comprises an annular groove 385, formed in its internal wall. A receptacle sealing gasket 390 is housed in the annular groove.

The receptacle defines a receptacle interior space 400 which contains a reagent 405 for generating the dihydrogen. The reagent may be in a solid form or in a liquid form. For example, it is formed of particles which may or may not be agglomerated together.

The reagent is, for example, a hydride or a liquid organic hydrogen carrier. The covering membrane is placed over the opening of the receptacle interior space and plugs same 410. Furthermore, the covering membrane is gastight and liquidtight. Thus, when the generator is in an inactive configuration, the covering membrane defines a hermetic barrier which prevents any fluidic communication between the receptacle interior space 400 and the reservoir interior space 265. No generation can therefore be carried out when the generator is in the inactivated configuration.

The covering membrane is preferably a film adhesively bonded in the groove formed in the receptacle side wall. The film may be taut, to make it easier to tear upon activation of the generator. It may be made of an alloy or, preferably, of a polymer material, for example polyethylene or polytetrafluoroethylene.

Furthermore, the lid comprises a piercing member 420 and a piercing actuator 425. The piercing member has a conical and pointed shape. The pointed tip of the cone is positioned at a distance from and facing the covering membrane in the inactivated configuration.

The piercing actuator comprises a rod 430 extending in the longitudinal direction and the piercing member 420 is attached to one end of the rod. The rod has an overall shape of a cylinder of revolution and comprises an annular flange 435 which, in the inactivated configuration, rests against the edge of the skirt which is opposite to the receptacle end wall. The rod is housed inside the annular skirt and is in contact with the receptacle sealing gasket over the entirety of its periphery.

The piercing actuator further comprises a push-button 440, the overall shape of which is a cylinder of revolution, arranged at the opposite end of the rod. The push-button is fixed rigidly to the rod or formed as one with the rod. It projects from the receptacle end wall in the longitudinal direction when the generator is in the inactivated configuration.

A hole 450 is formed in the push-button. It passes right through the push-button in a direction transverse to the longitudinal direction. A pin 455 is housed in the hole. It bears against the receptacle end wall on either side of the push-button. Thus, in the inactivated configuration, the rod is fixed relative to the skirt.

Moreover, the receptacle comprises a drain valve 460, arranged in a hole passing right through the receptacle end wall, and plugging said hole.

When the generator is in an activated configuration, whereby the receptacle interior space is in fluidic communication with the reservoir interior space, the drain valve places the reservoir in fluidic communication with the environment of the generator when the pressure in the reservoir is higher than or equal to a drain pressure. It hermetically isolates the reservoir from the environment of the generator when the pressure in the reservoir is lower than the drain pressure.

In order to generate dihydrogen using the generator, the user may employ the following steps.

First of all, notably when the reagent is a hydride, the user may pour a solvent into the reservoir interior space 265, through the filling pipe 290. For example, the solvent may be a solution of potassium hydroxide dissolved in water. Because the reservoir wall and the covering membrane are impervious to the liquid, the solvent does not come into contact with the enclosure wall and with the reagent. As a variant, the solvent may contain a hydride, for example identical to or different from the hydride contained in the receptacle.

Thereafter, the user may bring the generator into the activated configuration. To do that, the user may remove the pin 455 from the hole formed in the button 440 then press on the button in the longitudinal direction S so as to bring the piercing member 420 into contact with the covering membrane 350 until the membrane is ruptured. In this way, the receptacle interior space 400 is in fluidic communication with the reservoir interior space 265. The solvent then comes into contact with the reagent to form a solution, for example an aqueous solution of hydrides.

The control unit may be configured to bring the catalysis housing into the open position, so that, by bringing the catalyst into contact with the solution, the dihydrogen generation reaction is carried out.

The dihydrogen thus generated passes through the reservoir wall and is guided between the enclosure wall and the reservoir wall, as illustrated by the arrow C, as far as the discharge valve 300, where it is expelled from the generator under the effect of its pressure. A transport pipe, not depicted, may be connected at one of its ends to the discharge valve and at its opposite end to a fuel cell.

Furthermore, when the pressure in the enclosure reaches a predetermined maximum value, for example a pressure value equal to 2 bar, the control unit commands the closure of the housing. The pressure in the enclosure drops as the dihydrogen is discharged from the generator, until it reaches a predetermined minimum value, for example a pressure value equal to 1.5 bar, from which the control unit again commands the opening of the housing. Unless indicated otherwise, this pressure is absolute, that is to say that it is defined with respect to a zero reference value in the vacuum.

The generation of dihydrogen may be continued as long as the reagent concentration in the solution is sufficient.

In a variant in which the reagent contains a hydride, once the generation is finished, the hydride solution contains non-gaseous products resulting from the hydrogen generation reaction.

In order to prepare a further generation of di hydrogen within the reservoir, the user may bring the generator into a cleaning configuration.

In the cleaning configuration, the catalysis housing may be brought into the open position. A cleaning agent, for example water, raised to a temperature of between 30° C. and 70° C., may be injected under a draining pressure, for example higher than 1 bar, into the reservoir through the injection valve 295. The injection under pressure of the cleaning agent at a draining pressure leads to the opening of the drain valve 460 so that the injection of the cleaning agent causes the solution to be drained from the generator. As a variant, as described hereinabove, the drain valve may be self-sealing, and, in the cleaning configuration, an end piece may be fitted to the drain valve so as to drain the enclosure through the drain valve. Furthermore, the cleaning agent may be injected into the enclosure under pressure so as to accelerate the draining. The injection of liquid may be continued in order to dissolve the non-gaseous products resulting from the generation of hydrogen, which have for example accumulated on the reservoir wall and/or on the receptacle wall.

Thereafter, the removable receptacle empty of reagent may be removed and another receptacle containing reagent may be fitted to the vessel.

Moreover, when the vessel needs to be replaced, for example as a result of excessive corrosion or of a loss of effectiveness in permeability to dihydrogen of the reservoir wall, the catalytic system may be removed from the spent vessel and may be fitted to another fresh vessel. In the case of the examples 1 to 6, the catalytic system may be extracted through the opening 57 defined by the window 55. As a variant, in the case of the examples 1 to 5, when the lid is removed from the vessel, the opening providing access to the enclosure interior space may be defined by the opening 465 of the vessel opposite the vessel end wall, and the catalytic system may be extracted through the opening.

Figure 6:
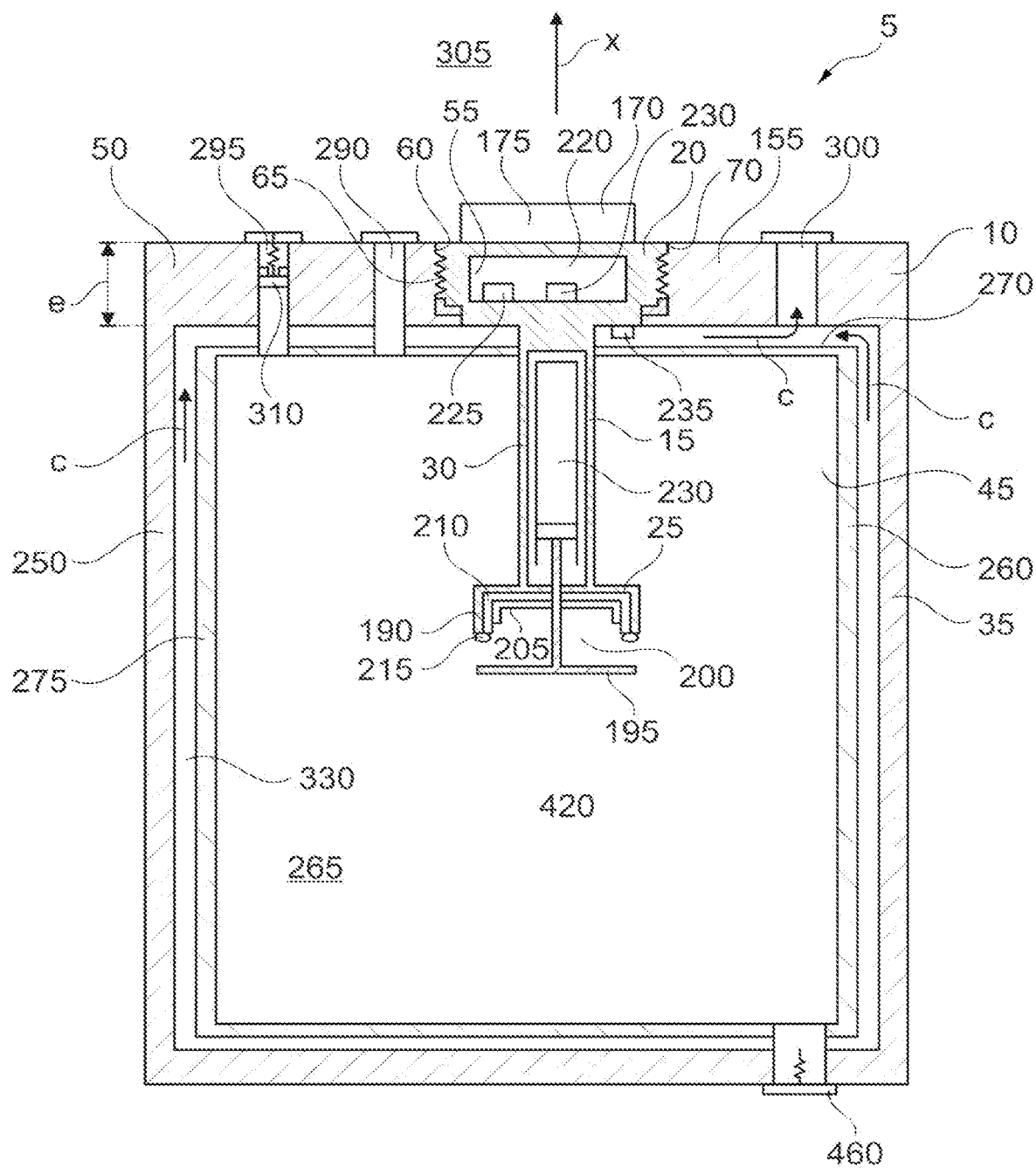
FIG. 6 depicts a cross section in a longitudinal plane of a sixth example of a generator according to the invention.

In a variant illustrated in FIG. 6, the generator differs from that illustrated in FIG. 1 in that the enclosure is monolithic. The reservoir has a shape substantially homothetic with the enclosure and has a reservoir end wall positioned at a distance from the enclosure end wall. The drain valve passes both through the reservoir wall and the enclosure wall. The reagent, for example containing hydrides in solution in a solvent or containing a liquid organic hydrogen carrier, may be introduced into the reservoir directly in liquid form through the filling pipe. Once the generation of dihydrogen is finished, the generator may be cleaned by following the steps described hereinabove. The catalytic system may be removed from the spent enclosure to be reused with a fresh enclosure. Of course, the invention is not restricted to the embodiments and examples described hereinabove.

The invention claimed is:

1. A dihydrogen generator comprising:
   an enclosure; and
   a catalytic system,
   the catalytic system being secured rigidly and removably to the enclosure and comprising a catalysis housing containing a catalyst for a reaction of generating the dihydrogen from a reagent chosen from a hydride, a liquid organic hydrogen carrier and mixtures thereof,
   the enclosure defining an enclosure interior space, the catalysis housing being placed at least in part in the enclosure interior space, and
   the generator comprising a reservoir for containing a liquid, the reservoir comprising a reservoir wall that is fluidtight with respect to liquid and permeable to dihydrogen, the catalytic system being placed at least in part in the reservoir.

2. The generator as claimed in claim 1, the catalytic system being secured to the enclosure using one of magnets, screw-fastening and snap-fastening.

3. The generator as claimed in claim 1, the enclosure comprising an opening providing access to the enclosure interior space, and the catalytic system being configured to be introduced into and extracted from the enclosure interior space via the opening providing access to the enclosure interior space when the catalytic system is being fitted to and removed from the enclosure, respectively.

4. The generator as claimed in claim 3, the catalytic system comprising a plug mounted removably on the enclosure.

5. The generator as claimed in claim 4, the plug plugging the opening providing access to the enclosure interior space.

6. The generator as claimed in claim 4, the enclosure defining another opening providing access to the enclosure interior space, the plug plugging the other opening providing access to the enclosure interior space.

7. The generator as claimed in claim 4, the catalysis housing being positioned at a distance from the plug.

8. The generator as claimed in claim 1, the catalysis housing comprising first and second components which together define a catalysis chamber, the catalyst being housed in the catalysis chamber, the first and second components being configured to move relative to each other between a closed position in which the catalysis chamber is isolated from the enclosure interior space and an open position in which the catalysis chamber is in fluidic communication with the enclosure interior space.

9. The generator as claimed in claim 1, the catalytic system comprising an information module configured to acquire and store information relating to a state of the catalytic system.

10. The generator as claimed in claim 1, the catalyst being at least one metal selected from cobalt, nickel, platinum, ruthenium and alloys thereof.

11. The generator as claimed in claim 1, the enclosure comprising a vessel and a lid configured to be fixed rigidly and removably to the vessel and plugging the vessel.

12. The generator as claimed in claim 11, the lid being one of screw-fastened and snap-fastened onto the vessel.

13. The generator as claimed in claim 12, the lid comprising a receptacle and a covering membrane hermetically plugging the receptacle, the receptacle being configured to contain a reagent.

14. The generator as claimed in claim 13, comprising a piercing member configured to pierce the covering membrane.

15. The generator as claimed in claim 14, comprising a piercing actuator configured to move the piercing member to pierce the covering membrane.

16. The generator as claimed in claim 14, the lid comprising the piercing member.

17. The generator as claimed in claim 1, the catalytic system being secured to the enclosure using a bayonet locking type device.

18. The generator as claimed in claim 11, the lid being secured to the vessel using one of magnets and a bayonet locking system.

* * * * *